United States Patent
Kim

(10) Patent No.: US 11,039,134 B2
(45) Date of Patent: Jun. 15, 2021

(54) METHOD AND APPARATUS FOR ENCODING/DECODING AN IMAGE BASED ON IN-LOOP FILTER

(71) Applicant: B1 INSTITUTE OF IMAGE TECHNOLOGY, INC., Seoul (KR)

(72) Inventor: Ki Baek Kim, Daejeon (KR)

(73) Assignee: B1 INSTITUTE OF IMAGE TECHNOLOGY, INC., Seoul (KR)

( * ) Notice: Subject to any disclaimer, the term of this patent is extended or adjusted under 35 U.S.C. 154(b) by 0 days.

(21) Appl. No.: 17/025,455

(22) Filed: Sep. 18, 2020

(65) Prior Publication Data
US 2021/0084296 A1    Mar. 18, 2021

Related U.S. Application Data

(63) Continuation of application No. PCT/KR2020/012252, filed on Sep. 10, 2020.

(30) Foreign Application Priority Data

Sep. 18, 2019   (KR) .................... 10-2019-0115073

(51) Int. Cl.
*H04N 19/117*    (2014.01)
*H04N 19/86*    (2014.01)
*H04N 19/46*    (2014.01)

(52) U.S. Cl.
CPC ........... *H04N 19/117* (2014.11); *H04N 19/46* (2014.11); *H04N 19/86* (2014.11)

(58) Field of Classification Search
CPC .............................. H04N 19/117; H04N 19/46
USPC .................................................... 375/240.29
See application file for complete search history.

(56) References Cited

U.S. PATENT DOCUMENTS

2012/0189051 A1*  7/2012  Zheng ................ H04N 19/86
                                                          375/240.12
2020/0336740 A1* 10/2020  Fang ................. H04N 19/117

FOREIGN PATENT DOCUMENTS

KR   10-2014-0060478 A   5/2014
KR   10-2018-0084705 A   7/2018
KR   10-2019-0043128 A   4/2019

OTHER PUBLICATIONS

Wang, Ye-Kui et al., "AHG12: Sub-picture based motion-constrained independent regions", *Joint Video Experts Team (JVET) of ITU-T SG 16 WP 3 and ISO/IEC JTC 1/SC 29/WG 11*, 15th Meeting: Gothernburg, Sweden, Jul. 3-12, 2019 (4 pages in English).
Wang, Ye-Kui et al., "AHG12: On turning off ALF filtering at brick and slice boundaries", *Joint Video Experts Team (JVET) of ITU-T SG 16 WP 3 and ISO/IEC JTC 1/SC 29/WG 11*, 15th Meeting: Gothernburg, Sweden, Jul. 3-12, 2019 (3 pages in English).
International Search Report dated Dec. 21, 2020 in counterpart International Patent Application No. PCT/KR2020/012252 (3 pages in Korean).

\* cited by examiner

*Primary Examiner* — Amir Shahnami
(74) *Attorney, Agent, or Firm* — NSIP Law

(57) ABSTRACT

An image encoding/decoding method and apparatus of the present invention may divide one picture into a plurality of division units, determine whether to perform filtering on a boundary of a current division unit based on a predetermined flag, and perform filtering on the boundary of the current division unit in response to the determination.

11 Claims, 11 Drawing Sheets

1st_region_flag = 0 / 2nd_region_flag = 1 flag = 1    flag = 1 flag = 0    flag = 0 flag = 1    flag = 0

METHOD AND APPARATUS FOR ENCODING/DECODING AN IMAGE BASED ON IN-LOOP FILTER

CROSS REFERENCE TO RELATED APPLICATIONS

Pursuant to 35 U.S.C. §§ 120 and 365(c), this application is a Bypass Continuation of International Application No. PCT/KR2020/012252, filed on Sep. 10, 2020, which claims the benefit under 35 U.S.C. §§ 119(a) and 365(b) of Korean Patent Application No. 10-2019-0115073, filed on Sep. 18, 2019, in the Korean Intellectual Property Office, the entire disclosure of which is incorporated herein by reference for all purposes.

TECHNICAL FIELD

The present invention relates to an image encoding/decoding method and apparatus.

BACKGROUND ART

Recently, demand for high-resolution and high-quality images such as High Definition (HD) images and Ultra High Definition (UHD) images is increasing in various application fields, and accordingly, high-efficiency image compression techniques are being discussed.

For image compression technology, various technologies such as inter prediction technology that predicts pixel value included in the current picture from a picture before or after the current picture using image compression technology, intra prediction technology that predicts pixel value included in the current picture by using pixel information in the current picture, an entropy encoding technology that allocates a short code to a value with a high frequency of appearance and a long code to a value with a low frequency of appearance, exist, and by using such the image compression technology, image data can be effectively compressed and transmitted or stored.

DISCLOSURE

Technical Problem

An object of the present invention is to provide a method and apparatus for dividing a picture into a predetermined division unit.

An object of the present invention is to provide a method and apparatus for adaptively performing filtering on a boundary of a division unit.

An object of the present invention is to provide a method and apparatus for applying an improved deblocking filter.

Technical Solution

The video decoding method and apparatus according to the present invention may divide one picture into a plurality of division units, determine whether to perform filtering on a boundary of a current division unit based on a predetermined flag, and perform filtering on the boundary of the current division unit in response to the determination.

In the video decoding method and apparatus according to the present invention, the division unit may include at least one of a sub picture, a slice, or a tile.

In the video decoding method and apparatus according to the present invention, the flag may include at least one of a first flag indicating whether filtering is performed on a boundary of a division unit within the one picture or a second flag indicating whether filtering is performed on the boundary of the current division unit in the one picture.

In the video decoding method and apparatus according to the present invention, when the first flag is a first value, it may not be restricted so that filtering is not performed on the boundary of the division unit within the one picture, and when the first flag is a second value, the restriction on the boundary of the division unit within the picture may not be imposed.

In the video decoding method and apparatus according to the present invention, when the second flag is the first value, it may be restricted so that filtering is not performed on the boundary of the current division unit, and when the second flag is the second value, filtering may be allowed to be performed on the boundary of the current division unit.

In the video decoding method and apparatus according to the present invention, the second flag may be decoded only when it is not restricted so that filtering is not performed on the boundary of the division unit within the one picture according to the first flag.

In the video decoding method and apparatus according to the present invention, whether to perform filtering on the boundary of the current division unit may be determined by further considering a third flag indicating whether filtering is performed on a boundary of a neighboring division unit adjacent to the current block unit.

In the video decoding method and apparatus according to the present invention, a position of the neighboring division unit may be determined based on whether the boundary of the current division unit is a vertical boundary or a horizontal boundary.

In the video decoding method and apparatus according to the present invention, the step of performing the filtering may comprise, specifying a block boundary for deblocking filtering, deriving a decision value for the block boundary, determining a filter type for the deblocking filtering based on the decision value, and performing filtering on the block boundary based on the filter type.

The video encoding method and apparatus according to the present invention may divide one picture into a plurality of division units, determine whether to perform filtering on a boundary of a current division unit, and perform filtering on the boundary of the current division unit in response to the determination.

In the video encoding method and apparatus according to the present invention, the division unit may include at least one of a sub picture, a slice, or a tile.

In the video encoding method and apparatus according to the present invention, the step of determining whether to perform filtering on the boundary of the current division unit may comprise, encoding at least one of a first flag indicating whether filtering is performed on a boundary of a division unit within the one picture or a second flag indicating whether filtering is performed on the boundary of the current division unit in the one picture.

In the video encoding method and apparatus according to the present invention, when it is determined that filtering is restricted not to be performed on the boundary of the division unit within the one picture, the first flag may be encoded as a first value, and when it is determined that the restriction is not imposed on the boundary of the division unit within the picture, the first flag may be encoded as a second value.

In the video encoding method and apparatus according to the present invention, when it is determined that filtering is restricted not to be performed on the boundary of the current division unit, the second flag may be encoded as the first value, and when it is determined that filtering is allowed to be performed on the boundary of the current division unit, the second flag may be encoded as the second value.

In the video encoding method and apparatus according to the present invention, the second flag may be encoded only when it is not restricted so that filtering is not performed on the boundary of the division unit within the one picture.

In the video encoding method and apparatus according to the present invention, whether to perform filtering on the boundary of the current division unit may be determined by further considering a third flag indicating whether filtering is performed on a boundary of a neighboring division unit adjacent to the current block unit.

In the video encoding method and apparatus according to the present invention, a position of the neighboring division unit may be determined based on whether the boundary of the current division unit is a vertical boundary or a horizontal boundary.

In the video encoding method and apparatus according to the present invention, wherein the step of performing the filtering comprises, specifying a block boundary for deblocking filtering, deriving a decision value for the block boundary, determining a filter type for the deblocking filtering based on the decision value, and performing filtering on the block boundary based on the filter type.

Advantageous Effects

According to the present invention, encoding/decoding efficiency can be improved by dividing one picture into various division units.

According to the present invention, encoding/decoding efficiency can be improved by adaptively performing filtering on the boundary of the division unit.

According to the present invention, image quality can be improved by applying an improved deblocking filter to a reconstructed image.

MODE FOR INVENTION

Figure 1:
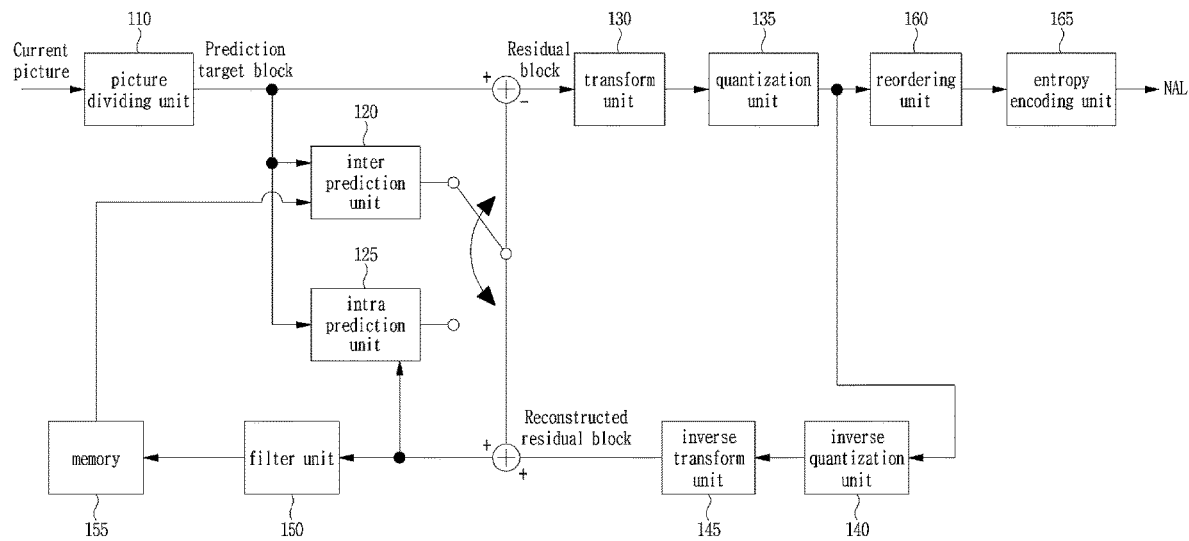
FIG. 1 is a block diagram showing an image encoding apparatus according to an embodiment of the present invention.

In the present invention, various modifications may be made and various embodiments may be provided, and specific embodiments will be illustrated in the drawings and described in detail in the detailed description. However, this is not intended to limit the present invention to a specific embodiment, it should be understood to include all changes, equivalents, and substitutes included in the idea and scope of the present invention. In describing each drawing, similar reference numerals have been used for similar elements.

Terms such as first and second may be used to describe various components, but the components should not be limited by the terms. These terms are used only for the purpose of distinguishing one component from another component. For example, without departing from the scope of the present invention, a first component may be referred to as a second component, and similarly, a second component may be referred to as a first component. The term and/or includes a combination of a plurality of related listed items or any of a plurality of related listed items.

When a component is referred to as being "connected" or "connected" to another component, it may be directly connected or connected to the another component, but it should be understood that other component may exist in the middle. On the other hand, when a component is referred to as being "directly connected" or "directly connected" to another component, it should be understood that there is no other component in the middle.

The terms used in the present application are only used to describe specific embodiments, and are not intended to limit the present invention. Singular expressions include plural expressions unless the context clearly indicates otherwise. In the present application, terms such as "comprise" or "have" are intended to designate the presence of features, numbers, steps, actions, components, parts, or combinations thereof described in the specification, but one or more other features. It should be understood that the presence or addition of elements or numbers, steps, actions, components, parts, or combinations thereof, does not preclude in advance.

Hereinafter, preferred embodiments of the present invention will be described in more detail with reference to the accompanying drawings. Hereinafter, the same reference numerals are used for the same elements in the drawings, and duplicate descriptions for the same elements are omitted.

FIG. 1 is a block diagram showing an image encoding apparatus according to an embodiment of the present invention.

Referring to FIG. 1, the image encoding apparatus 100 may include a picture division unit 110, a prediction unit 120, 125, a transform unit 130, a quantization unit 135, a rearrangement unit 160, and an entropy encoding unit 165, an inverse quantization unit 140, an inverse transform unit 145, a filter unit 150, and a memory 155.

Each of the components shown in FIG. 1 is independently shown to represent different characteristic functions in an image encoding apparatus, and does not mean that each component is formed of separate hardware or a single software component. That is, each constituent part is listed and included as a respective constituent part for convenience of explanation, and at least two constituent parts of each constituent part are combined to form one constituent part, or one constituent part may be divided into a plurality of constituent parts to perform a function. Integrated embodiments and separate embodiments of the components are also included in the scope of the present invention unless departing from the essence of the present invention.

In addition, some of the components may not be essential components that perform essential functions in the present invention, but may be optional components only for improving performance. The present invention may be implemented by including only components essential to implement the essence of the present invention excluding components used for performance improvement, and a structure including only essential components excluding optional components used for performance improvement may be also included in the scope of the present invention.

The picture division unit 110 may divide the input picture into at least one processing unit. In this case, the processing unit may be a prediction unit (PU), a transform unit (TU), or a coding unit (CU). The picture division unit 110 may encode the picture by dividing into a combination of a plurality of coding units, prediction units, and transform units, and selecting the combination of a coding unit, a prediction unit, and a transformation unit based on a predetermined criterion (for example, a cost function).

For example, one picture may be divided into a plurality of coding units. In order to split the coding units in a picture, a recursive tree structure such as a quad tree structure may be used, and a coding unit that is split into other coding unit based on one image or the largest coding unit as a root may be divided with as many child nodes as the number of divided coding units. Coding units that are no longer split according to certain restrictions become leaf nodes. That is, when it is assumed that only square splitting is possible for one coding unit, one coding unit may be split into up to four different coding units.

Hereinafter, in an embodiment of the present invention, a coding unit may be used as a meaning of a unit that performs encoding, or may be used as a meaning of a unit that performs decoding.

The prediction unit may be obtained by dividing one coding unit into at least one square or non-square shape of the same size. One coding unit may be divided such that one prediction unit of prediction units has a different shape and/or size from another prediction unit.

When a prediction unit that performs intra prediction based on a coding unit is not a minimum coding unit, intra prediction may be performed without dividing into a plurality of N×N prediction units.

The prediction units 120 and 125 may include an inter prediction unit 120 that performs inter prediction, and an intra prediction unit 125 that performs intra prediction. Whether to use inter prediction or intra prediction for a prediction unit may be determined, and specific information (e.g., intra prediction mode, motion vector, reference picture, etc.) according to each prediction method may be determined. In this case, a processing unit in which prediction is performed may be different from a processing unit in which a prediction method and specific content are determined. For example, a prediction method and a prediction mode are determined in a prediction unit, and prediction may be performed in a transformation unit. The residual value (residual block) between the generated prediction block and the original block may be input to the transform unit 130. In addition, prediction mode information, motion vector information, and the like used for prediction may be encoded by the entropy encoding unit 165 together with the residual value and transmitted to the decoder. In the case of using a specific encoding mode, it is possible to encode an original block as it is and transmit it to a decoder without generating a prediction block through the prediction units 120 and 125.

The inter prediction unit 120 may predict a prediction unit based on information of at least one of a previous picture or a subsequent picture of the current picture, and in some cases, predict a prediction unit based on information of some regions, which encoding has been completed, in the current picture. The inter prediction unit 120 may include a reference picture interpolation unit, a motion prediction unit, and a motion compensation unit.

The reference picture interpolation unit may receive reference picture information from the memory 155 and generate pixel information of an integer pixel or less in the reference picture. In the case of a luma pixel, a DCT-based 8-tap interpolation filter (DCT-based interpolation filter) having different filter coefficients may be used to generate pixel information of an integer pixel or less in units of a ¼ pixels. In case of a chroma signal, a DCT-based 4-tap interpolation filter (DCT-based interpolation filter) having different filter coefficients may be used to generate pixel information of an integer pixel or less in units of ⅛ pixels.

The motion prediction unit may perform motion prediction based on the reference picture interpolated by the reference picture interpolation unit. As a method for calculating the motion vector, various methods such as Full Search-based Block Matching Algorithm (FBMA), Three Step Search (TSS), and New Three-Step Search Algorithm (NTS) may be used. The motion vector may have a motion vector value in units of ½ or ¼ pixels based on the interpolated pixels. The motion prediction unit may predict a current prediction unit by differently using a motion prediction method. Various methods such as a skip method, a merge method, an AMVP (Advanced Motion Vector Prediction) method, and an intra block copy method may be used as the motion prediction method.

The intra prediction unit 125 may generate a prediction unit based on reference pixel information around a current block, which is pixel information in a current picture. When the neighboring block of the current prediction unit is a block that performs inter prediction and the reference pixel is a pixel that performs inter prediction, the reference pixel included in the block that performs inter prediction may be used by replacing it with reference pixel information of a block that performs intra prediction around it. That is, when the reference pixel is not available, the unavailable reference pixel information may be used by replacing with at least one reference pixel among the available reference pixels.

In intra prediction, the prediction mode may have a directional prediction mode in which reference pixel information is used according to a prediction direction and a non-directional mode in which directional information is not used when prediction is performed. A mode for predicting luma information and a mode for predicting chroma information may be different, and intra prediction mode information or predicted luma signal information used to predict luma information may be used to predict chroma information.

When the size of the prediction unit and the size of the transformation unit are the same when performing intra prediction, intra prediction for the prediction unit may be performed based on a pixel on the left, a pixel on the above left, and a pixel on the above of the prediction unit. However, when the size of the prediction unit and the size of the transformation unit are different when performing intra prediction, intra prediction may be performed using a reference pixel based on the transformation unit. Also, intra prediction using N×N splitting may be used for only the minimum coding unit.

The intra prediction method may generate a prediction block after applying an AIS (Adaptive Intra Smoothing) filter to a reference pixel according to a prediction mode. The types of AIS filters applied to the reference pixels may be different. In order to perform the intra prediction method, the intra prediction mode of the current prediction unit may be predicted from the intra prediction mode of the prediction unit existing around the current prediction unit. When predicting the prediction mode of the current prediction unit using the mode information predicted from the neighboring prediction unit, if the intra prediction mode of the current prediction unit and the neighboring prediction unit are the same, information indicating that the prediction mode of the current prediction unit and the neighboring prediction units are the same may be transmitted using predetermined flag information, and if the prediction modes of the current prediction unit and the neighboring prediction units are different, entropy encoding may be performed to encode prediction mode information of the current block.

In addition, a residual block including residual information that is a difference value between the prediction unit that performs prediction based on the prediction units generated by the prediction units 120 and 125 and the original block of the prediction unit may be generated. The generated residual block may be input to the transform unit 130.

The transform unit 130 may transform a residual block including residual information between a prediction unit generated by the prediction units 120 and 125 and the original block by using the transform method such as DCT (Discrete Cosine Transform), DST (Discrete Sine Transform), and KLT. Whether DCT, DST, or KLT is applied to transform the residual block may be determined based on intra prediction mode information of a prediction unit used to generate the residual block.

The quantization unit 135 may quantize values transformed to the frequency domain by the transform unit 130. The quantization coefficient may vary depending on the block or the importance of the image. The value calculated by the quantization unit 135 may be provided to the inverse quantization unit 140 and the rearrangement unit 160.

The rearrangement unit 160 may perform the rearrangement of the coefficient value for the quantized residual value.

The rearrangement unit 160 may change coefficients of 2-dimensional block form into 1-dimensional vector form through a coefficient scanning method. For example, the rearrangement unit 160 may change into a 1-dimensional vector form by scanning from a DC coefficient to a coefficient in a high frequency region according to a Zig-Zag Scan method. Depending on the size of the transform unit and the intra prediction mode, a vertical scan of scanning coefficients of two-dimensional block form in a column direction and a horizontal scan of scanning coefficients of two-dimensional block form in a row direction may be used instead of a zig-zag scan. That is, depending on the size of the transform unit and the intra prediction mode, it may be determined which one of a zigzag scan, a vertical scan, and a horizontal scan is used.

The entropy encoding unit 165 may perform entropy-encoding based on values calculated by the rearrangement unit 160. Various encoding methods, such as exponential Golomb, CAVLC (Context-Adaptive Variable Length Coding), and CABAC (Context-Adaptive Binary Arithmetic Coding), may be used for entropy-encoding.

The entropy encoder 165 may encode various information, such as residual value coefficient information, block type information, prediction mode information, division unit information, prediction unit information, transmission unit information, motion vector information, reference frame information, block interpolation information, filtering information, etc.

The entropy encoder 165 may entropy-encode a coefficient value of a coding unit input from the reordering unit 160.

The inverse quantization unit 140 and the inverse transform unit 145 inverse-quantize the values quantized by the quantization unit 135 and inverse-transform the values transformed by the transform unit 130. The reconstructed block may be generated by combining the residual value generated by the inverse quantization unit 140 and the inverse transform unit 145 with the prediction unit predicted through the motion estimation unit, the motion compensation unit, and the intra prediction unit included in the prediction units 120 and 125.

The filter unit 150 may include at least one of a deblocking filter, an offset correction unit, and an adaptive loop filter (ALF).

The deblocking filter may remove block distortion caused by boundary between blocks in the reconstructed picture. In order to determine whether to perform deblocking, it may be determined whether to apply the deblocking filter to the current block based on the pixels included in several columns or rows included in the block. When applying a deblocking filter to a block, a strong filter or a weak filter may be applied according to the required deblocking filtering strength. In addition, in applying the deblocking filter, horizontal filtering and vertical filtering may be processed in parallel when performing vertical filtering and horizontal filtering.

The offset correction unit may correct an offset from the original image in units of pixels for the deblocking-filtered image. In order to perform offset correction for a specific picture, after classifying the pixels included in the image into a certain number of regions and determining the region to which the offset is applied, a method of applying the offset to the region offset or a method of applying the offset by considering edge information of each pixel may be used.

ALF (Adaptive Loop Filtering) may be performed based on a value obtained by comparing a filtered reconstructed image with an original image. After classifying the pixels included in the image into a predetermined group, one filter to be applied to the group may be determined to perform filtering differently for each group. Information related to whether to apply ALF may be transmitted for each coding unit (CU) of a luma signal, and a shape and filter coefficient of an ALF filter to be applied may vary according to each block. In addition, the same type (fixed type) ALF filter may be applied regardless of the characteristics of the block to be applied.

The memory 155 may store the reconstructed block or picture output from the filter unit 150, and the stored reconstructed block or picture may be provided to the prediction units 120 and 125 when performing inter prediction.

Figure 2:
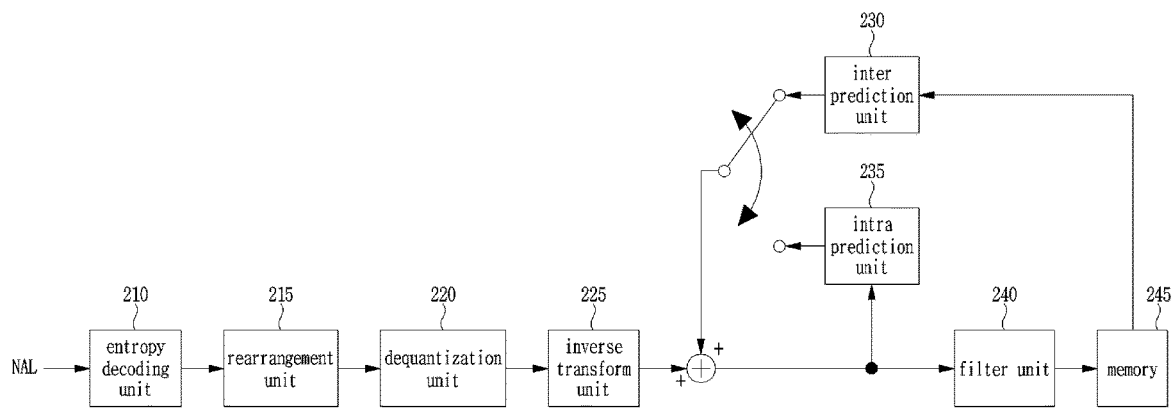
FIG. 2 is a block diagram showing an image decoding apparatus according to an embodiment of the present invention.

FIG. 2 is a block diagram showing an image decoding apparatus according to an embodiment of the present invention.

Referring to FIG. 2, the image decoder 200 may include an entropy decoding unit 210, a rearrangement unit 215, an inverse quantization unit 220, an inverse transform unit 225, a prediction unit 230, 235, and a filter unit 240, a memory 245.

When an image bitstream is input from the image encoder, the input bitstream may be decoded in a procedure opposite to that of the image encoder.

The entropy decoding unit 210 may perform entropy-decoding in a procedure opposite to that performed by entropy-encoding in the entropy encoding unit of the image encoder. For example, various methods corresponding to the method performed in the image encoder such as Exponential Golomb (CAVLC), Context-Adaptive Variable Length Coding (CAVLC), and Context-Adaptive Binary Arithmetic Coding (CABAC) may be applied.

The entropy decoding unit 210 may decode information related to intra prediction and inter prediction performed by the encoder.

The rearrangement unit 215 may perform rearrangement of the bitstream entropy-decoded by the entropy decoding unit 210 based on a rearrangement method of the encoding unit. The coefficients of a 1-dimensional vector form may be rearranged into coefficients of a 2-dimensional block form again. The rearrangement unit 215 may perform reordering through a method of receiving information related to coefficient scanning performed by the encoder and performing reverse scanning based on the scanning order performed by the corresponding encoder.

The inverse quantization unit 220 may perform inverse quantization based on the quantization parameter provided by the encoder and the coefficients of the rearranged block.

The inverse transform unit 225 may perform inverse transform, that is, inverse DCT, inverse DST, and inverse KLT, corresponding to transforms performed by the transform unit, that is, DCT, DST, and KLT for the quantization results performed by the image encoder. The inverse transform may be performed based on the transmission unit determined by the image encoder. In the inverse transform unit 225 of the image decoder, a transform method (for example, DCT, DST, KLT) may be selectively performed according to a plurality of information such as a prediction method, a size of a current block, and a prediction direction.

The prediction units 230 and 235 may generate a prediction block based on prediction block generation related information provided by the entropy decoding unit 210 and previously decoded block or picture information provided by the memory 245.

As described above, when a size of the prediction unit and a size of the transform unit are the same in performing intra prediction in the same manner as in the image encoder, the intra prediction of the prediction unit may be performed based on pixels located on the left, the top-left and the top of the prediction unit. However, when the size of the prediction unit and the size of the transform unit are different in performing intra prediction, the intra prediction may be performed using a reference pixel based on the transform unit. In addition, the intra prediction using N×N division may be used only for the minimum coding unit.

The prediction units 230 and 235 may include a prediction unit determination unit, an inter prediction unit, and an intra prediction unit. The prediction unit determination unit may receive various information from the entropy decoding unit 210 such as prediction unit information, prediction mode information of an intra prediction method, and motion prediction related information of an inter prediction method, classify the prediction unit from the current coding unit, and determine whether the prediction unit performs inter prediction or intra prediction. The inter prediction unit 230 may perform inter prediction for a current prediction unit based on information included in at least one of a previous picture or a subsequent picture of the current picture including the current prediction unit, by using information required for inter prediction of the current prediction unit provided by the image encoder. Alternatively, inter prediction may be performed based on information on a partial region previously-reconstructed in the current picture including the current prediction unit.

In order to perform inter prediction, a motion prediction method of a prediction unit included in a coding unit may be determined among a skip mode, a merge mode, an AMVP mode, and an intra block copy mode.

The intra prediction unit 235 may generate a prediction block based on pixel information in the current picture. When the prediction unit is a prediction unit that has performed intra prediction, intra prediction may be performed based on intra prediction mode information of a prediction unit provided by an image encoder. The intra prediction unit 235 may include an adaptive intra smoothing (AIS) filter, a reference pixel interpolation unit, and a DC filter. The AIS filter is a part that performs filtering on the reference pixel of the current block and may be applied by determining whether to apply the filter according to the prediction mode of the current prediction unit. AIS filtering may be performed on a reference pixel of a current block by using prediction mode and AIS filter information of a prediction unit provided by an image encoder. When the prediction mode of the current block is a mode that does not perform AIS filtering, the AIS filter may not be applied.

When the prediction mode of the prediction unit is the prediction unit that performs intra prediction based on the pixel value obtained by interpolating the reference pixel, the reference pixel interpolation unit may interpolate the reference pixel to generate a reference pixel of an integer pixel or less. When the prediction mode of the current prediction unit is a prediction mode in which a prediction block is generated without interpolating a reference pixel, the reference pixel may not be interpolated. The DC filter may generate a prediction block through filtering when the prediction mode of the current block is the DC mode.

The reconstructed block or picture may be provided to the filter unit 240. The filter unit 240 may include a deblocking filter, an offset correction unit, and an ALF.

Information about whether a deblocking filter is applied to a corresponding block or picture and information about whether a strong filter is applied or a weak filter is applied in applying the deblocking filter may be provided from a video encoder. In the deblocking filter of the video decoder, information related to the deblocking filter provided by the video encoder may be provided, and the video decoder may perform deblocking filtering on the corresponding block.

The offset correction unit may perform offset correction on the reconstructed image based on a type of offset correction and offset value information applied to the image during encoding.

ALF may be applied to a coding unit based on information on whether to apply ALF, ALF coefficient information, and the like, provided by an encoder. This ALF information may be provided from a specific parameter set.

The memory 245 may store the reconstructed picture or block so that it can be used as a reference picture or a reference block, and may also provide the reconstructed picture to an output unit.

As described above, in an embodiment of the present invention, for convenience of description, a coding unit is used as a coding unit, but it may be a unit that performs not only encoding but also decoding.

FIGS. 3 to 6 illustrate a method of dividing one picture into one or more division units according to the present disclosure.

One picture may be divided into division units pre-defined in the encoding/decoding apparatus. Here, the pre-defined division unit may include at least one of a sub picture, a slice, a tile, or a brick.

Specifically, one picture may be divided into one or more tile rows or one or more tile columns. In this case, the tile may mean a group of blocks covering a predetermined rectangular area in the picture. Here, the block may mean a coding tree block (largest coding block). Coding tree blocks belonging to one tile may be scanned based on a raster scan order.

Tiles may be divided into one or more bricks. Bricks may be composed of blocks in rows or columns of tiles. That is, the division into bricks may be performed only in either a vertical direction or a horizontal direction. However, the present invention is not limited thereto, and one tile may be divided into a plurality of bricks based on one or more vertical lines and one or more horizontal lines. Brick may be a sub-concept of a tile, and may be called a sub-tile.

One slice may include one or more tiles. Alternatively, one slice may include one or more bricks. Alternatively, one slice may be defined as one or more coding tree block rows (CTU rows) in a tile. Alternatively, one slice may be defined as one or more coding tree block columns (CTU columns) within a tile. That is, one tile may be set as one slice, and one tile may be composed of a plurality of slices. When one tile is divided into a plurality of slices, the division may be limited to be performed only in the horizontal direction. In this case, the vertical boundary of the slice may coincide with the vertical boundary of the tile, but the horizontal boundary of the slice is not same with the horizontal boundary of the tile, but rather may coincide with the horizontal boundary of the coding tree block in the tile. On the other hand, the division may be limited to be performed only in the vertical direction.

The encoding/decoding apparatus may define a plurality of splitting modes for a slice. For example, the segmentation mode may include at least one of a raster-scan mode and a rectangular slice mode. In the case of the raster-scan mode, one slice may include a series of tiles (or blocks, bricks) according to the raster scan order. In the case of the rectangular slice mode, one slice may include a plurality of tiles forming a rectangular area, or may include one or more rows (or columns) of coding tree blocks in one tile forming a rectangular area.

The information on the split mode of the slice may be explicitly encoded by an encoding device and signaled to a decoding device, or may be implicitly determined by an encoding/decoding device. For example, a flag indicating whether it is a rectangular slice mode may be signaled. When the flag is a first value, a raster-scan mode may be used, and when the flag is a second value, a rectangular slice mode may be used. The flag may be signaled at at least one level of a video parameter set (VPS), a sequence parameter set (SPS), a picture parameter set (PPS), or a picture header (PH).

As described above, one slice may be configured in a rectangular unit including one or more blocks, bricks, or tiles, and the location and size information of the slice may be expressed in the corresponding unit.

The sub picture may include one or more slices. Here, the slice may cover a rectangular area within one picture. That is, the boundary of the sub picture may always coincide with the slice boundary, and the vertical boundary of the sub picture may always coincide with the vertical boundary of the tile. All coding tree blocks (CTUs) belonging to one sub picture may belong to the same tile. All coding tree blocks belonging to one tile may belong to the same sub picture.

In the present invention, a picture may be composed of one or more sub pictures, a sub picture may be composed of one or more slices, tiles, or bricks, a slice may be composed of one or more tiles or bricks, and a tile may be composed of one or more bricks. It is described on the assumption that it can be configured, but is not limited thereto. That is, as described above, one tile may be composed of one or more slices.

Figure 3:
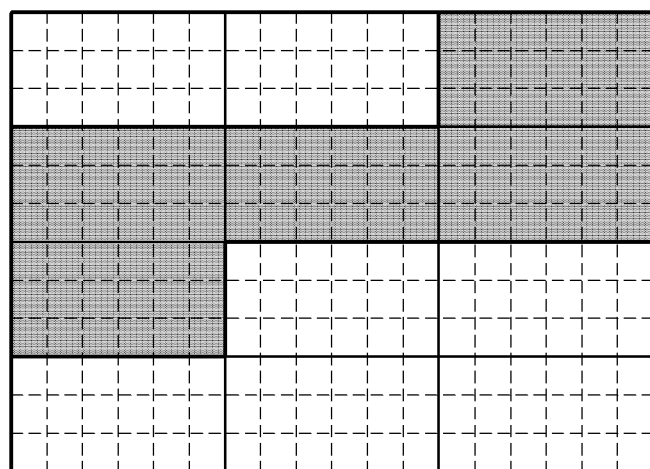
FIGS. 3 to 6 illustrate a method of dividing one picture into one or more division units according to the present disclosure.

The division unit may be composed of an integer number of blocks, but is not limited thereto and may be composed of a decimal number instead of an integer number. That is, when it is not composed of an integer number of blocks, at least one division unit may be composed of sub-blocks. FIG. 3 illustrates an example of slice division according to a raster-scan mode. Referring to FIG. 3, it may be seen that it is composed of 18×12 blocks (each column and row), 12 tiles, and 3 slices. Here, the slice may be regarded as an example of a group of blocks or tiles according to a predetermined scan (raster scan).

Figure 4:
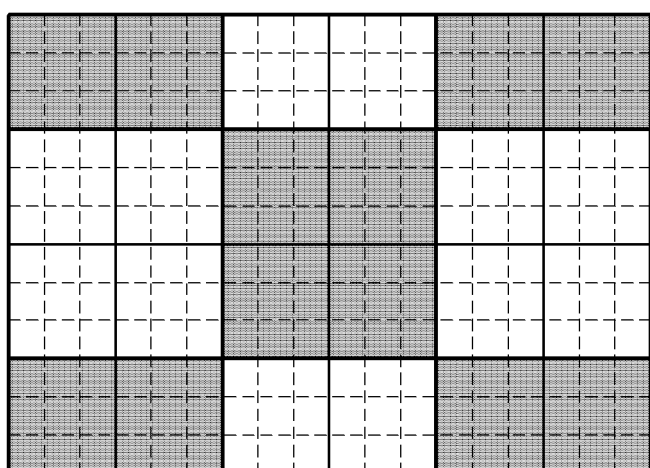

FIG. 4 illustrates an example of slice division according to a rectangular slice mode. Referring to FIG. 4, it may be seen that it is composed of 18×12 blocks, 24 tiles, and 9 slices. Here, 24 tiles may be represented by 6 tile columns and 4 tile rows.

Figure 5:
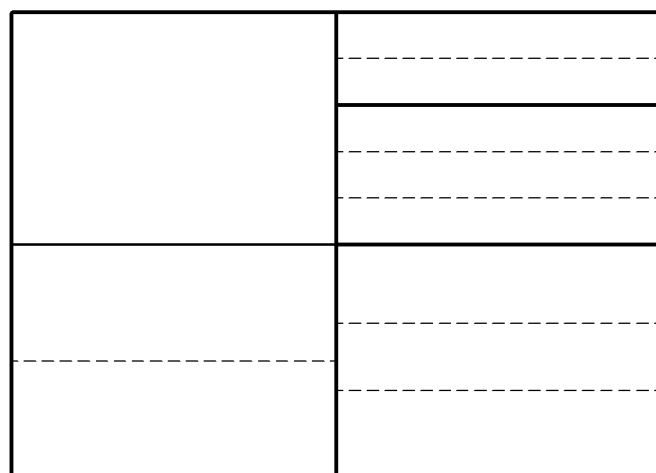

FIG. 5 illustrates an example in which one picture is divided into a plurality of tiles and rectangular slices. Referring to FIG. 5, one picture may be composed of 11 bricks, 4 tiles (2 tile columns and 2 tile rows), and 4 slices.

Figure 6:
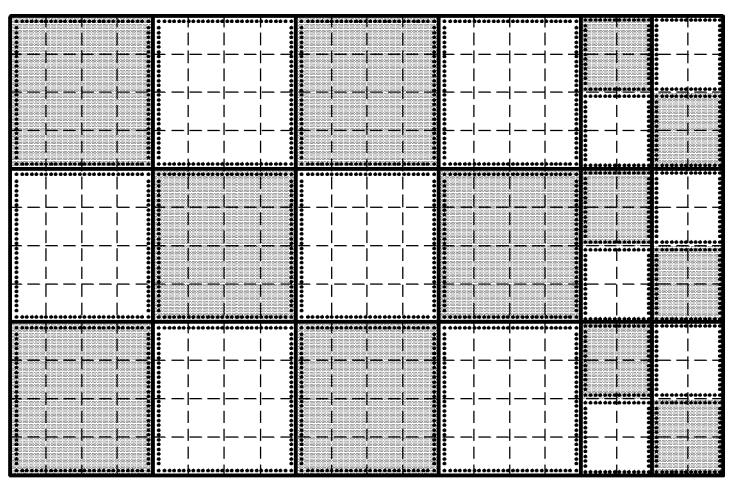

FIG. 6 illustrates an example of dividing one picture into a plurality of sub pictures. Referring to FIG. 6, one picture may consist of 18 tiles. Here, 4×4 blocks on the left (i.e., 16 CTUs) may constitute one tile, and 2×4 blocks on the right (i.e., 8 CTUs) may constitute one tile. Also, like a tile on the left, one tile may be one sub picture (or slice), and like a tile on the right, one tile may be composed of two sub pictures (or slices).

Table 1 shows examples of division or configuration information on a sub picture according to the present disclosure, and encoding control information (e.g., information on whether to apply an in-loop filter to a boundary, etc.).

TABLE 1

```
subpics_present_flag
if( subpics_present_flag ) {
    max_subpics_minus1
    subpic_grid_col_width_minus1
    subpic_grid_row_height_minus1
    for( i = 0; i < NumSubPicGridRows; i++ )
        for( j = 0; j < NumSubPicGridCols; j++ )
            subpic_grid_idx[ i ][ j ]
    for( i = 0; i <= NumSubPics; i++ ) {
        subpic_treated_as_pic_flag[ i ]
        loop_filter_across_subpic_enabled_flag[ i ]
    }
}
```

In Table 1, subpics_present_flag means whether a sub picture is supported, and when the sub picture is supported (when 1), information on the number of sub pictures (max_subpic_minus1) or information width or height (subpic_grid_col_width_minus1, subpic_grid_row_height_minus1) of the sub picture may be generated. At this time, length information such as width and height may be expressed as it is (e.g., in units of 1 pixel) or may be expressed as multiple, exponent, etc. of a predetermined unit/constant (e.g., integers such as 2, 4, 8, 16, 32, 64, 128, etc., or maximum encoding unit, minimum coding unit, maximum transform unit, minimum transform unit, etc.).

Here, based on the width and height of the picture, and the width and height (equal length) of each sub picture, how many sub pictures exist in the picture in units of columns and rows (NumSubPicGridRows, NumSubPicGridCols)

may be derived. In addition, how many sub pictures are in the picture (NumSubPics) may be derived.

The above example assumes that the width or height of each sub picture is uniform, but it may also be possible when at least one of the width or height of each sub picture is not uniform. Therefore, a flag specifying whether all sub pictures constituting one picture have the same size may be used.

When all sub pictures do not have the same size according to the flag, position information of each sub picture and size information of each sub picture may be encoded/decoded. On the other hand, when all sub pictures have the same size according to the flag, size information may be encoded/decoded only for the first sub picture.

Information on how many sub pictures exist in a column or row unit in a picture may be generated, and information on the width or height of each sub picture may be individually generated.

After sub pictures are partitioned in units of columns and rows, an index of each sub picture may be allocated. In the implicit case, indexes may be allocated based on a predetermined scan order (raster scan, etc.) (e.g., 0, 1, 2, etc. indexes are allocated to the left->right of the first sub picture row), but explicitly index information each sub picture (subpic_grid_idx) may be generated.

In the case of a sub picture, it may be determined whether to set as a picture (subpic_treated_as_pic_flag) during a decoding process excluding an in-loop filtering operation. This may operate in relation to whether a sub picture can be considered as one independent picture (when the flag is 1) in processing such as a reference picture list for inter prediction.

It is possible to determine whether to set all sub pictures within a picture as pictures (one flag is applied in common), or it is possible to determine whether to individually set them as pictures (a plurality of flags are applied individually). Here, a plurality of individual flags may be encoded/decoded for each sub picture only when a restriction that all sub pictures are treated as pictures according to one flag applied in common is not imposed.

In addition, loop_fiter_across_subpic_enabled_flag[i] may determine whether to perform the filtering operation across the boundary of the i-th sub picture. If it is 1, it is performed across, if it is 0, it is not performed.

Here, the part related to loop_fitler_across_subpic_enabled_flag may be applied in the same/similar manner not only in the case of the syntax element but also in the example of processing the boundary of various division units described later.

The area located at the boundary of the picture cannot be referred or filtered because there is no data outside the picture. That is, the area located inside a picture may be referred to or may be filtered.

On the other hand, even inside a picture, it can be divided into in units of such as sub pictures, slices, tiles, bricks, etc., and in the case of some division units, whether to refer to regions adjacent to both sides of the boundary of different division units, whether to apply filtering, and the like may be adaptively determined.

Here, whether to cross-reference both regions adjacent to the boundary may be determined by explicit information or may be implicitly determined.

Here, whether to perform boundary filtering (e.g., an in-loop filter or an inside loop filter, De-blocking filter, SAO, ALF, etc.) may be determined by explicit information or implicitly determined.

For example, in the case of some units A, cross-reference for encoding/decoding between division units may be possible, and filtering may be performed on a boundary of the division unit. For example, in the case of some units B, cross-referencing for encoding/decoding between division units may be prohibited, and filtering cannot be performed on the boundary of division units. For example, in the case of some units C, cross-reference for encoding/decoding between division units may be prohibited, and filtering may be performed on a boundary of the division unit. For example, in the case of some units D, cross-reference for encoding/decoding between division units may be possible, and whether to perform filtering at a boundary of the division unit may be determined based on predetermined flag information. For example, in the case of some units (E), whether to cross-reference for encoding/decoding between division units may be determined based on predetermined flag information, and whether to perform filtering on the boundary of division units may be determined based on predetermined flag information.

The A to E division units may correspond to at least one of the above-described sub picture, slice, tile, or brick. For example, all of the division units A to E may be sub pictures, tiles, or slices. Alternatively, some of the A to E division units may be sub pictures, and the rest may be slices or tiles. Alternatively, some of the A to E division units may be slices and the rest may be tiles.

Figure 7:
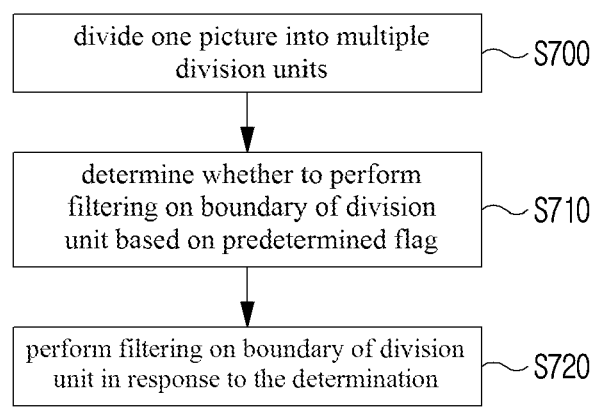
FIG. 7 illustrates a method of performing filtering based on a predetermined flag according to the present disclosure.

FIG. 7 illustrates a method of performing filtering based on a predetermined flag according to the present disclosure.

Referring to FIG. 7, one picture may be divided into a plurality of division units (S700).

The division unit may be at least one of the aforementioned sub picture, slice, tile, and brick. For example, one picture may be divided into a plurality of sub pictures. Of course, one picture may be additionally divided into a plurality of slices and/or tiles in addition to the sub picture. Since the division unit is the same as described above, a detailed description will be omitted here.

Referring to FIG. 7, it may be determined whether to perform filtering on a boundary of a division unit based on a predetermined flag (S710).

For convenience of explanation, it is assumed that the division unit in the present disclosure is a sub picture. However, the present disclosure is not limited thereto, and the present disclosure may be applied same/similarly to the boundary of a slice, tile, or brick. In addition, filtering in the present disclosure may mean in-loop filtering applied to a reconstructed picture, and a filter for the in-loop filtering may include at least one of a deblocking filter (DF), a sample adaptive offset (SAO), or an adaptive loop filter (ALF).

The division unit may be supported for purposes such as parallel processing and partial decoding.

Therefore, when the encoding/decoding of each division unit is finished, whether to perform filtering at a boundary between division units or filtering at a boundary of division unit (e.g., in-loop filter) may be determined implicitly or explicitly.

Specifically, a flag indicating whether to perform filtering on the boundary of the division unit may be used. Here, the flag may be implicitly determined in a higher unit including a plurality of division units, or may be explicitly encoded/decoded. The higher unit may mean a picture or may mean a unit composed of only some of the division units constituting the picture. Alternatively, the flag may be implicitly determined for each division unit, or may be explicitly encoded/decoded. Alternatively, the flag may be implicitly determined for each boundary of the division unit, or may be explicitly encoded/decoded. This will be described in detail with reference to FIGS. 8 to 15.

Referring to FIG. 7, filtering may be performed on a boundary of a division unit in response to the determination in S710 (S720).

Specifically, at least one of a deblocking filter, a sample adaptive offset, or an adaptive loop filter may be applied to the boundary of the division unit. The above-described filters may be sequentially applied according to a predetermined priority. For example, after the deblocking filter is applied, a sample adaptive offset may be applied. After the sample adaptive offset is applied, the adaptive loop filter may be applied. A method of applying the deblocking filter to the boundary of the division unit will be described in detail with reference to FIG. 16.

FIGS. 8 to 15 illustrate a method of determining whether filtering is performed on a boundary of a division unit based on one or more flags according to the present disclosure.

A flag for determining whether to perform filtering at the boundary of the division unit may be supported for each type of division unit. For example, at least one of a flag indicating whether filtering is performed on the boundary of a sub picture (loop_filter_across_subpic_enabled_flag, hereinafter referred to as a first flag), a flag indicating whether filtering is performed on the boundary of a slice (loop_filter_across_slices_enabled_flag, hereinafter referred to as a second flag), a flag indicating whether filtering is performed on the boundary of the tile (loop_filter_across_tiles_enabled_flag, hereinafter referred to as a third flag), or a flag indicating whether filtering is performed on the boundary of the brick (loop_filter_across_bricks_enabled_flag, hereinafter referred to as a fourth flag) may be supported.

Alternatively, the encoding/decoding apparatus may support only some of the aforementioned flags. For example, {the first flag, the second flag, the third flag}, {the first flag, the second flag, the fourth flag}, {the second flag, the third flag, the fourth flag}, {the first flag, the second flag}, {the first flag, the third flag}, {the first flag, the fourth flag}, {the second flag, the third flag}, {the second flag, the fourth flag}, {the third flag, the fourth flag}, {the first flag}, {the second flag}, {the third flag}, or {the fourth flag} may be supported.

Also, all of the first to fourth flags described above may be explicitly supported, or, some of the first to fourth flags may be explicitly supported, and the others may be implicitly supported. For example, one of the first to fourth flags may be explicitly supported, and the other may be implicitly determined based on the explicitly supported flag.

In an embodiment to be described later, for convenience of description, the first to fourth flags will be referred to as loop_filter_across_enabled_flag. In addition, it is assumed that the flag is supported when the corresponding division unit is supported.

Figure 8:
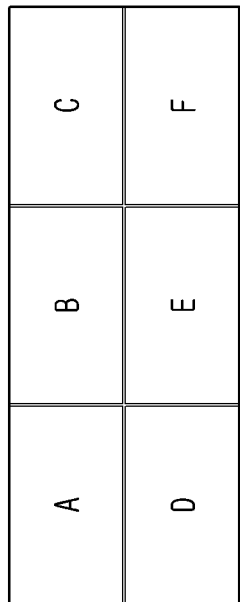
FIGS. 8 to 15 illustrate a method of determining whether filtering is performed on a boundary of a division unit based on one or more flags according to the present disclosure.
Figure 8:
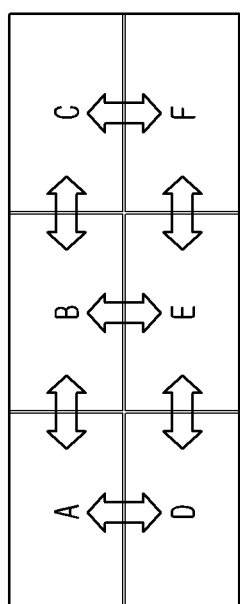

FIG. 8 illustrates an example in which a flag (loop_filter_across_enabled_flag) is supported for one picture including a plurality of division units.

Referring to Table 2, when the flag (loop_filter_across_enabled_flag) is a first value, filtering is restricted not to be performed at the boundary of a division unit in a picture, and when the flag is a second value, the restriction is not imposed on the boundary of the division unit. That is, when the flag is the second value, filtering on the boundary of the division unit within the picture may be performed or may not be performed.

In other words, when the flag is the first value, it may mean that the boundary of the division unit is treated the same as the boundary of the picture, and when the flag is the second value, it may mean that the limitation that the boundary of the division unit is treated the same as the boundary of the picture is not imposed.

TABLE 2

| loop_filter_across_enabled_flag |
|---|

In FIG. 8, A to F denote a division unit, the presence of an arrow as shown in the left drawing may mean that filtering between the boundaries of the division unit can be performed, and as shown in the right drawing, the absence of an arrow may mean that filtering between the boundaries of is restricted not to be performed. For convenience of explanation, it is assumed that each division unit has a rectangular shape.

The above embodiment refers to a case where it is determined whether to collectively perform filtering on a division unit in a picture, regardless of a vertical relationship between division units.

Figure 9:
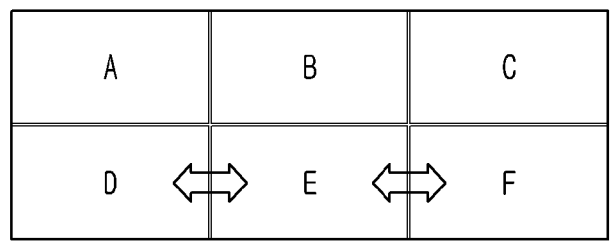

FIG. 9 illustrates an example in which the flag is individually supported in a higher unit of a division unit. That is, based on the flag of the higher unit, it may be determined whether to perform filtering on the boundary of the division unit existing in the higher unit.

Referring to Table 3, a flag (loop_filter_across_enabled_flag) may be encoded/decoded for each higher unit. loop_filter_across_enabled_flag[i] may indicate whether filtering is performed on the boundary of the division unit within the i-th higher unit. For example, when the flag is a first value, filtering is restricted not to be performed on the boundary of the division unit within the higher unit, and when the flag is a second value, the restriction is not imposed on the boundary of the division unit within the higher unit. That is, when the flag is the second value, filtering may or may not be performed on the boundary of the division unit within the higher unit.

Alternatively, when the flag is a first value, filtering may not be performed on the boundary of the division unit within the higher unit, and when the flag is the second value, filtering may be performed on the boundary of the division unit within the higher unit. This may mean that filtering may be performed on at least one boundary of the division units within the higher unit, or filtering may be performed on the boundary of all division units belonging to the higher unit.

In this embodiment, one picture may be composed of a plurality of higher units, and each higher unit may be composed of a plurality of division units. For example, when the higher unit is a sub picture, the division unit may be a tile, a slice, or a brick. Alternatively, the higher unit may be defined as a group of sub pictures having a smaller size than a picture, and in this case, the division unit may be a sub picture, tile, slice, or brick.

TABLE 3

| for( i = 0; i < Num_Units; i ++ ) |
| loop_filter_across_enabled_flag [i] |
|---|

The above embodiment refers to a case in which a flag for determining whether to perform filtering on a boundary of a division unit is supported in a higher unit defined as a group of a predetermined division unit.

Referring to FIG. 9, one picture may be composed of two higher units (i.e., a first higher unit composed of A to C and a second higher unit composed of D to F).

In the first higher unit, it is the case in which the flag indicating whether to perform filtering is 0, and in the second higher unit, it is the case in which the flag indicating whether to perform filtering is 1. The boundary between the first higher unit and the division unit belonging to the second higher unit may or may not be filtered by a flag that determines whether to perform filtering of the higher unit.

Figure 10:
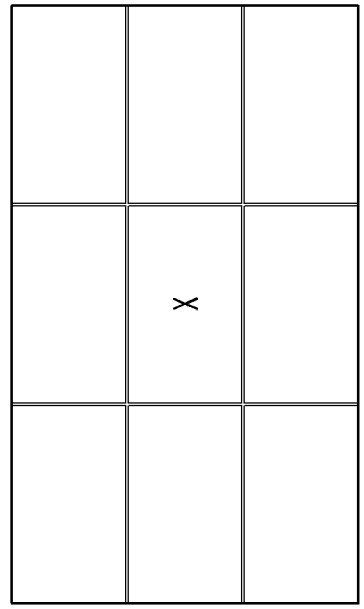
Figure 10:
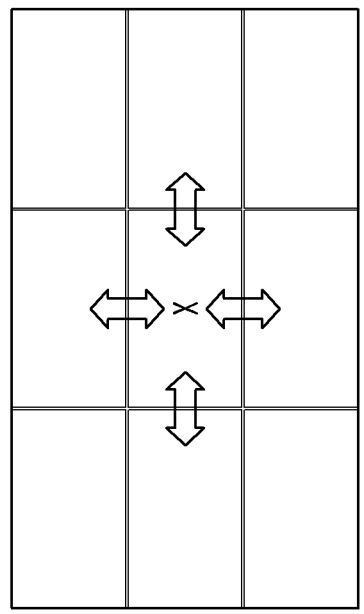

FIG. 10 illustrates a case in which a flag (loop_filter_across_enabled_flag) is supported for each division unit constituting one picture.

This embodiment, unlike the embodiment of FIG. 9, is an example of determining whether filtering is performed on the boundary of each division unit. Thus, even if the syntax elements are the same as in Table 2, their meanings may be different.

Referring to Table 4, a flag (loop_filter_across_enabled_flag) may be encoded/decoded for each division unit. loop_filter_across_enabled_flag[i] may indicate whether filtering is performed on the boundary of the i-th division unit in the picture.

For example, when the flag is a first value, filtering is restricted so that no filtering is performed on the boundary of the i-th division unit in the picture, and when the flag is a second value, filtering may be performed on the boundary of the i-th division unit in the picture. That is, when the flag is the second value, filtering may or may not be performed on the boundary of the division unit within the picture.

Meanwhile, a flag for each division unit (loop_filter_across_enabled_flag[i]) may be selectively encoded/decoded based on a flag (loop_filter_across_enabled_flag) for one picture. The flag for one picture is the same as described in the embodiment of FIG. 8, and a detailed description will be omitted.

For example, when filtering is restricted so that no filtering is performed on a boundary of a division unit within a picture according to a flag for one picture, the flag for each division unit is not encoded/decoded. According to the flag for the one picture, the flag for each of the division units may be encoded/decoded only when the restriction is not imposed on the boundary of the division unit.

Meanwhile, the flag for one picture and the flag for each of the division units may be encoded/decoded at the same level. Here, the same level may be any one of a video parameter set, a sequence parameter set, or a picture parameter set.

TABLE 4 for( i = 0; i < Num_Units; i ++ )
    loop_filter_across_enabled_flag [i]

Referring to FIG. 10, based on a flag for each division unit, filtering may be performed on a boundary of a corresponding division unit as shown in the left drawing, and filtering may not be performed on the boundary of a corresponding division unit as shown in the right drawing.

Figure 11:
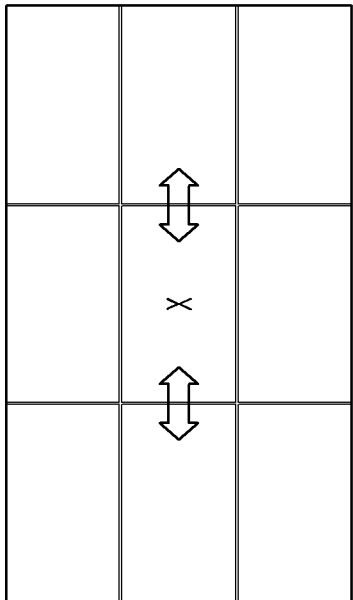
Figure 11:
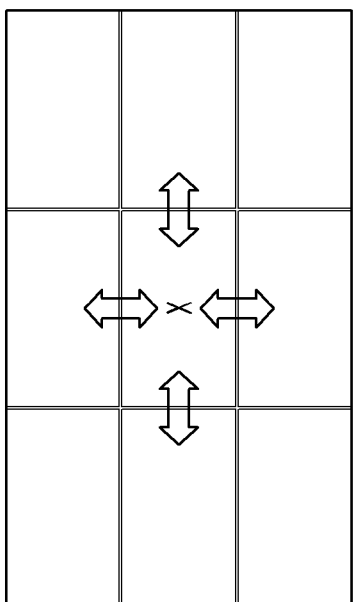
Figure 11:
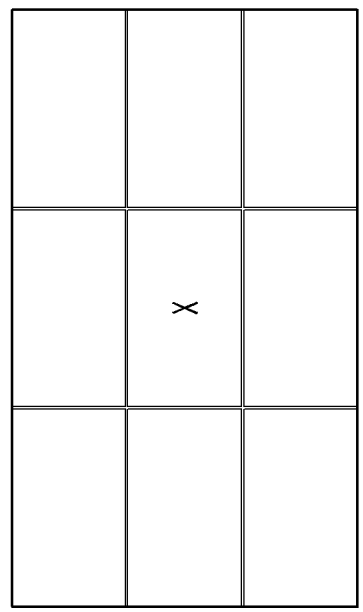

FIG. 11 illustrates a method of determining whether to perform filtering according to a boundary position of a division unit.

This embodiment relates to the embodiment of FIG. 9 or the embodiment of FIG. 10 described above. When it is determined that filtering is performed on the boundary of each division unit, predetermined direction information to which filtering is applied may be encoded/decoded.

Referring to Table 5, information on whether filtering is performed on boundary at least one of left, right, top, or bottom directions may be encoded/decoded. When a boundary of a specific direction among the boundaries of a division unit coincides with a boundary of a picture, encoding/decoding of information about the corresponding direction may be omitted.

In this embodiment, a flag for determining whether to perform filtering on a boundary in a specific direction is used, and a flag for determining whether to perform filtering in unit of a bundle in some directions (e.g., left+right, top+bottom, left+right+top, etc.) may be used.

TABLE 5 for( i = 0; i < Num_Units; i ++ )
{
    loop_filter_across_enabled_flag [i]
    if( loop_liter_across_enabled_flag [i] )
    {
        loop_filter_left_boundary_flag[i]
        loop_filter_right_boundary_flag[i]
        loop_filter_top_boundary_flag[i]
        loop_filter_bottom_boundary_flag[i]
    }
}

Referring to FIG. 11, the left drawing shows a case in which filtering is performed on the boundary in the omni-directional direction of the division unit (X). The central figure shows a case in which filtering is performed only on the left and right boundary of the division unit (x), and the right figure shows a case where filtering is not performed on the boundary of the division unit (X).

Figure 12:
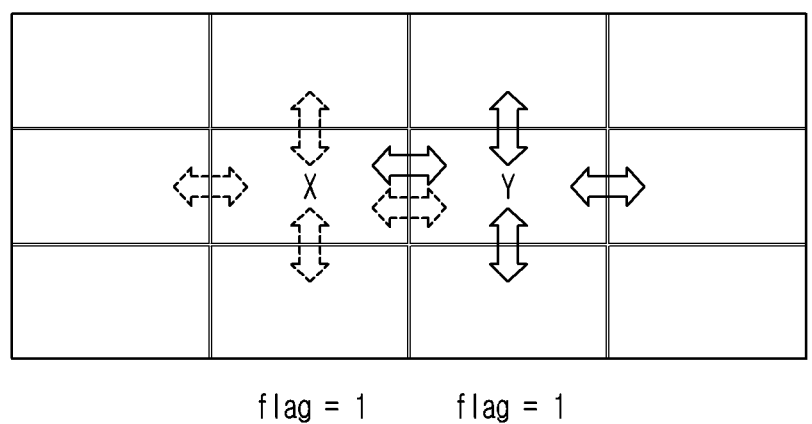
Figure 12:
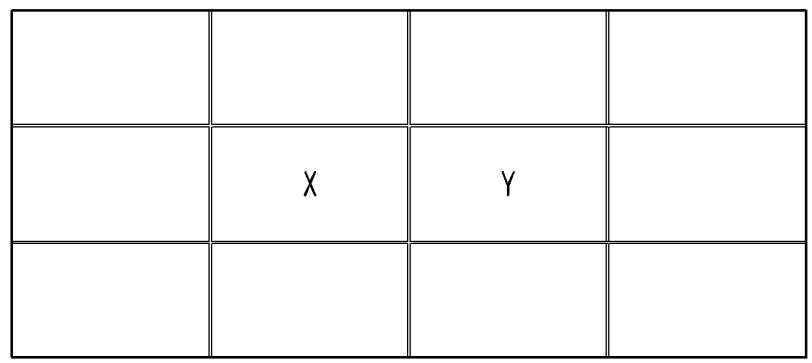
Figure 13:
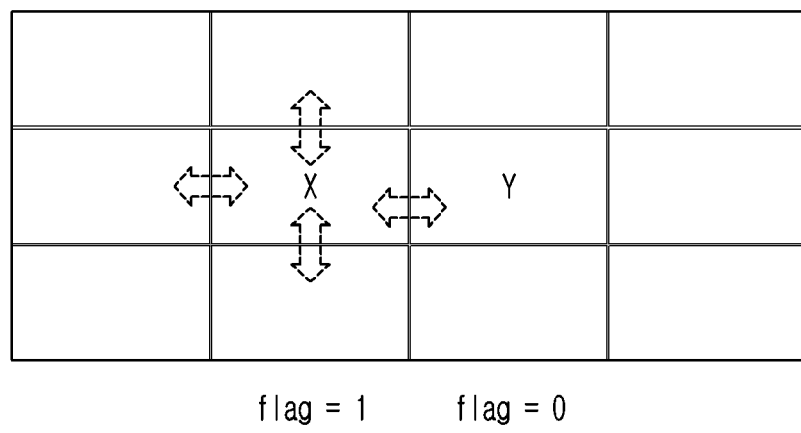

FIGS. 12 and 13 illustrate a method of determining whether to perform filtering on a boundary of a current division unit based on a flag for a neighboring division unit.

This embodiment may be related to the embodiment of FIG. 10 described above. That is, whether to perform filtering on the boundary of the current division unit may be determined by further considering a flag for the neighboring division unit in addition to the flag for the current division unit. When the boundary of the current division unit is a vertical boundary, the neighboring division unit may mean a division unit adjacent to the left or right of the current division unit. When the boundary of the current division unit is a horizontal boundary, the neighboring division unit may mean a division unit adjacent to the top or bottom of the current division unit.

Referring to FIG. 12, it is assumed that filtering is performed on the boundary in the division units of X and Y. Since it is determined that filtering is performed on the boundary where X and Y contact each other, filtering may be performed on the right boundary of the division unit X (i.e., the left boundary of the division unit Y).

Referring to FIG. 13, this is a case where it is determined that filtering is not performed for only one of the division units X and Y. That is, since the flag (loop_filter_across_enabled_flag) for the division unit X is 1, filtering may be performed on the boundary of the division unit X. On the other hand, since the flag (loop_filter_across_enabled_flag) for the division unit Y is 0, filtering is not performed on the boundary of the division unit Y.

One of the reasons for filtering between division units is to reduce deterioration between division units caused by individual encoding/decoding between division units.

Thus, as in the above embodiment, filtering may be performed on the boundary of one of the adjacent division regions and filtering may not be performed on the boundary of the other division region.

Alternatively, if applying filtering only to the boundary of one of the division regions may not be effective in removing image quality deterioration, it may be determined not to perform filtering on the boundary.

For example, when values of the flag for the division unit X and the flag for the division unit Y are different from each other, filtering may be performed on the boundary between the division units X and Y, or it may be determined that filtering is allowed.

For example, it is assumed that the left boundary of the current block coincides with the left boundary of the current division unit to which the current block belongs. In this case, even if the flag for the current division unit is 0, if the flag for the left division unit adjacent to the current division unit is 1, filtering may be performed on the left boundary of the current block.

Similarly, it is assumed that the top boundary of the current block coincides with the top boundary of the current division unit to which the current block belongs. In this case, even if the flag for the current division unit is 0, if the flag for the top division unit adjacent to the current division unit is 1, filtering may be performed on the top boundary of the current block.

Alternatively, when the values of the flag for the division unit X and the flag for the division unit Y are different from each other, it may be determined that filtering is not performed or filtering is not allowed at the boundary between the division units X and Y.

For example, it is assumed that the left boundary of the current block coincides with the left boundary of the current division unit to which the current block belongs. In this case, even if the flag for the current division unit is 1, if the flag for the left division unit adjacent to the current division unit is 0, filtering may not be performed on the left boundary of the current block.

Similarly, it is assumed that the top boundary of the current block coincides with the top boundary of the current division unit to which the current block belongs. In this case, even if the flag for the current division unit is 1, if the flag for the top division unit adjacent to the current division unit is 0, filtering may not be performed on the top boundary of the current block.

Figure 14:
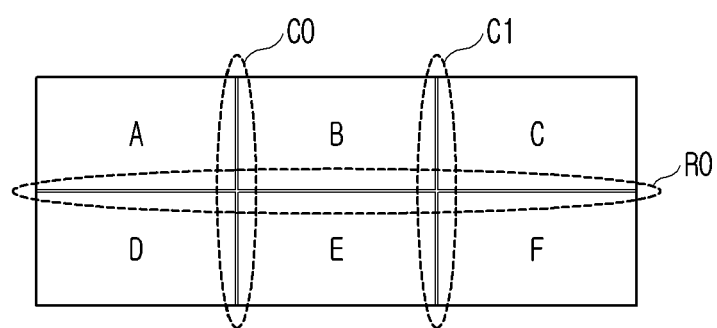

FIG. 14 illustrates a case in which information indicating whether to perform filtering is generated for each division unit boundary.

Referring to FIG. 14, whether to perform filtering for each division boundary line that divides or partitions division units A to F may be performed. If filtering is performed on the C0 boundary, filtering may be performed on the A and B boundaries, and on the D and E boundary, otherwise, filtering may not be performed on the boundary.

The number or index of the C0, C1, R0, etc. may be derived by the division information or the partition information of the division unit. Alternatively, information for explicitly allocating information on the division unit boundary and an index may be generated. As shown in the syntax elements of Table 6 below, information for determining whether to perform filtering may be generated at each division unit boundary (in this example, each column or row) based on Num_units_rows and Num_unit_cols.

TABLE 6

```
for( i = 0; i < Num_Unit_Rows; i ++ )
{
    loop_filter_across_row [i]
}
```

TABLE 6-continued

```
for( i = 0; i < Num_Unit_Cols; i ++ )
{
    loop_filter_across_col [i]
}
```

Figure 15:
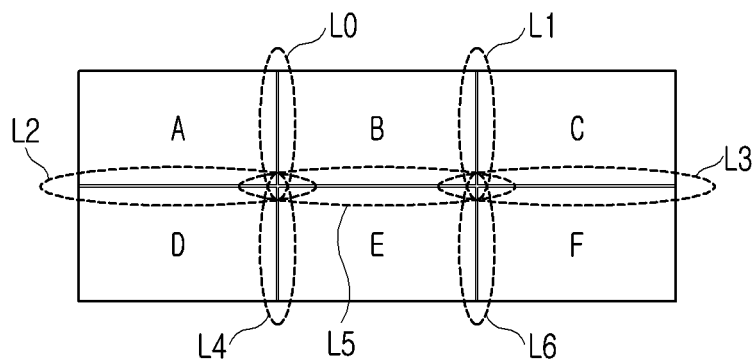

FIG. 15 illustrates another example in which information indicating whether to perform filtering is generated for each division unit boundary.

Referring to FIG. 15, whether to perform filtering for each division boundary line that divides or partitions division units A to F may be performed. The difference from the embodiment of FIG. 14 is that related information is generated for each divisional unit boundary, not for one column or row across the picture.

If filtering is performed on the L0 boundary, filtering may be performed on the A and B boundary, otherwise, filtering may not be performed on the boundary.

The number or index of the C0, C1, R0, etc. may be derived by the division information or the division information of the division unit. Alternatively, information for explicitly allocating information on the division unit boundary and an index may be generated. As in the syntax element of Table 7, information for determining whether to perform filtering at each division unit boundary may be generated based on Num_unit_boundary.

TABLE 7

```
for( i = 0; i < Num_Unit_boundary, i ++ )
{
    loop_filter_across [i]
}
```

Figure 16:
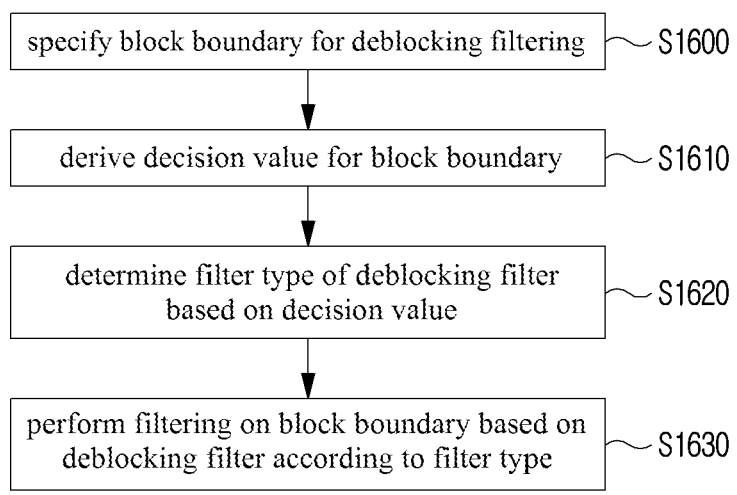
FIG. 16 illustrates a method of applying a deblocking filter according to the present disclosure.

FIG. 16 illustrates a method of applying a deblocking filter according to the present disclosure.

Referring to FIG. 16, a block boundary for deblocking filtering (hereinafter, referred to as an edge) among block boundaries of a reconstructed picture may be specified (S1600).

The reconstructed picture may be partitioned into a predetermined N×M sample grid. The N×M sample grid may mean a unit in which deblocking filtering is performed. Here, N and M may be 4, 8, 16 or more integers. Each pixel grid may be defined for each component type. For example, when the component type is a luminance component, N and M may be set to 4, and when the component type is a chrominance difference component, N and M may be set to 8. Regardless of the component type, a fixed-size N×M pixel grid may be used.

The edge is a block boundary positioned on an N×M sample grid, and may include at least one of a boundary of a transform block, a boundary of a prediction block, or a boundary of a sub-block.

Referring to FIG. 16, a decision value for the specified edge may be derived (S1610).

In this embodiment, it is assumed that the edge type is a vertical edge, and a 4×4 sample grid is applied. Based on the edge, the left block and the right block will be referred to as P blocks and Q blocks, respectively. The P block and the Q block are pre-reconstructed blocks, the Q block refers to a region in which deblocking filtering is currently performed, and the P block may refer to a block spatially adjacent to the Q block.

First, the decision value may be derived using a variable dSam for inducing the decision value. The variable dSam may be derived for at least one of a first pixel line or a fourth pixel line of the P block and the Q block. Hereinafter, dSam for the first pixel line (row) of the P block and Q block is referred to as dSam0, and dSam for the fourth pixel line (row) is referred to as dSam3.

When at least one of the following conditions is satisfied, dSam0 may be set to 1, otherwise, dSam0 may be set to 0.

TABLE 8

| | condition |
|---|---|
| 1 | dqp < first threshold |
| 2 | (sp + sq) < second threshold |
| 3 | spq < third threshold |

In Table 8, dpq may be derived based on at least one of a first pixel value linearity d1 of the first pixel line of the P block or a second pixel value linearity d2 of the first pixel line of the Q block. Here, the first pixel value linearity d1 may be derived using i pixels p belonging to the first pixel line of the P block. The i may be 3, 4, 5, 6, 7 or more. The i pixels p may be continuous pixels adjacent to each other, or may be non-contiguous pixels separated by a predetermined interval. In this case, the pixel p may be i pixels closest to the edge among the pixels of the first pixel line. Similarly, the second pixel value linearity d2 can be derived using j pixels q belonging to the first pixel line of the Q block. The j may be 3, 4, 5, 6, 7 or more. The j is set to the same value as the i, but is not limited thereto, and may be a value different from the i. The j pixels q may be contiguous pixels adjacent to each other, or may be non-contiguous pixels separated by a predetermined interval. In this case, the pixel q may be j pixels closest to the edge among the pixels of the first pixel line.

For example, when three pixels p and three pixels q are used, the first pixel value linearity d1 and the second pixel value linearity d2 may be derived as in Equation 1 below.

$$d1=\text{Abs}(p2,0-2*p1,0+p0,0)$$

$$d2=\text{Abs}(q2,0-2*q1,0+q0,0) \quad \text{[Equation 1]}$$

Alternatively, when six pixels p and six pixels q are used, the first pixel value linearity d1 and the second pixel value linearity d2 may be derived as in Equation 2 below.

$$d1=(\text{Abs}(p2,0-2*p1,0+p0,0)+\text{Abs}(p5,0-2*p4,0+p3,0)+1)>>1$$

$$d2=(\text{Abs}(q2,0-2*q1,0+q0,0)+\text{Abs}(q5,0-2*q4,0+q3,0)+1)>>1 \quad \text{[Equation 2]}$$

In Table 8, sp may denote a first pixel value gradient v1 of a first pixel line of the block P, and sq may denote a second pixel value gradient v2 of a first pixel line of the Q block. Here, the first pixel value gradient v1 may be derived using m pixels p belonging to the first pixel line of the P block. The m may be 2, 3, 4, 5, 6, 7 or more. The m pixels p may be contiguous pixels adjacent to each other, or may be non-contiguous pixels separated by a predetermined interval. Alternatively, some of the m pixels p may be contiguous pixels adjacent to each other, and the others may be non-contiguous pixels separated by a predetermined interval. Similarly, the second pixel value gradient v2 may be derived using n pixels q belonging to the first pixel line of the Q block. The n may be 2, 3, 4, 5, 6, 7 or more. The n is set to the same value as m, but is not limited thereto, and may be a value different from m. The n pixels q may be contiguous pixels adjacent to each other, or may be non-contiguous pixels separated by a predetermined interval. Alternatively, some of the n pixels q may be contiguous pixels adjacent to each other, and the others may be non-contiguous pixels separated by a predetermined interval.

For example, when two pixels p and two pixels q are used, a first pixel value gradient v1 and a second pixel value gradient v2 may be derived as in Equation 3 below.

$$v1=\text{Abs}(p3,0-p0,0)$$

$$v2=\text{Abs}(q0,0-q3,0) \quad \text{[Equation 3]}$$

Alternatively, when six pixels p and six pixels q are used, the first pixel value gradient v1 and the second pixel value gradient v2 may be derived as in Equation 4 below.

$$v1=\text{Abs}(p3,0-p0,0)+\text{Abs}(p7,0-p6,0-p5,0+p4,0)$$

$$v2=\text{Abs}(q0,0-q3,0)+\text{Abs}(q4,0-q5,0-q6,0+q7,0) \quad \text{[Equation 4]}$$

The spq in Table 8 may be derived from the difference between the pixel p0,0 and the pixel q0,0 adjacent to the edge.

The first and second thresholds of Table 8 may be derived based on a predetermined parameter QP. Here, the QP may be determined using at least one of a first quantization parameter of the P block, a second quantization parameter of the Q block, or an offset for inducing QP. The offset may be a value encoded and signaled by an encoding device. For example, QP may be derived by adding the offset to the average value of the first and second quantization parameters. The third threshold of Table 8 may be derived based on the above-described quantization parameter (QP) and block boundary strength (BS). Here, the BS may be variably determined in consideration of a prediction mode of a P/Q block, an inter prediction mode, a presence or absence of a non-zero transform coefficient, a difference in motion vectors, etc.

For example, when at least one prediction mode of the P block and the Q block is an intra mode, the BS may be set to 2. When at least one of the P blocks or the Q blocks is encoded in the combined prediction mode, the BS may be set to 2. When at least one of the P block or Q block includes a non-zero transform coefficient, the BS may be set to 1. When the P block is coded in an inter prediction mode different from the Q block (e.g., when the P block is coded in the current picture reference mode and the Q block is coded in the merge mode or AMVP mode), the BS may be set to 1. When both the P block and the Q block are coded in the current picture reference mode, and the difference between their block vectors is greater than or equal to a predetermined threshold difference, the BS may be set to 1. Here, the threshold difference may be a fixed value (e.g., 4, 8, 16) pre-committed to the encoding/decoding device.

Since dSam3 is derived using one or more pixels belonging to the fourth pixel line through the same method as dSam0 described above, a detailed description will be omitted.

A decision value may be derived based on the derived dSam0 and dSam3. For example, when both dSam0 and dSam3 are 1, the decision value may be set to a first value (e.g. 3), otherwise, the decision value may be set to a second value (e.g., 1 or 2).

Referring to FIG. 16, a filter type of a deblocking filter may be determined based on the derived decision value (S1620).

In the encoding/decoding apparatus, a plurality of filter types having different filter lengths may be defined. As an example of the filter type, there may be a long filter having the longest filter length, a short filter having the shortest filter length, or one or more middle filters that are longer than the short filter and shorter than the long filter. The number of filter types defined in the encoding/decoding apparatus may be 2, 3, 4 or more.

For example, when the decision value is the first value, the long filter may be used, and when the decision value is the second value, the short filter may be used. Alternatively, when the decision value is the first value, one of the long filter or the middle filter may be selectively used, and when the decision value is the second value, the short filter may be used. Alternatively, when the decision value is the first value, the long filter is used, and when the decision value is not the first value, either the short filter or the middle filter may be selectively used. In particular, when the decision value is 2, the middle filter may be used, and when the decision value is 1, the short filter may be used.

Referring to FIG. 16, filtering may be performed on an edge of a reconstructed picture based on a deblocking filter according to the determined filter type (S1630).

The deblocking filter may be applied to a plurality of pixels located in both directions based on an edge and located in the same pixel line. Here, a plurality of pixels to which the deblocking filter is applied is referred to as a filtering region, and the length (or number of pixels) of the filtering region may be different for each filter type. The length of the filtering region may be interpreted as having the same meaning as the filter length of the aforementioned filter type. Alternatively, the length of the filtering region may mean a sum of the number of pixels to which the deblocking filter is applied in the P block and the number of pixels to which the deblocking filter is applied in the Q block.

In this embodiment, it is assumed that three filter types, that is, the long filter, the middle filter, and the short filter, are defined in an encoding/decoding apparatus, and a deblocking filtering method for each filter type will be described. However, the present disclosure is not limited thereto, and only the long filter and the middle filter may be defined, only the long filter and the short filter may be defined, or only the middle filter and the short filter may be defined.

1. In Case of Long Filter-Based Deblocking Filtering

For convenience of explanation, it is assumed that the edge type is a vertical edge, and the currently filtered pixel (hereinafter, the current pixel q) belongs to the Q block unless otherwise stated. The filtered pixel fq may be derived through a weighted average of a first reference value and a second reference value.

Here, the first reference value may be derived using all or part of the pixels in the filtering area to which the current pixel q belongs. Here, the length (or number of pixels) of the filtering region may be an integer of 8, 10, 12, 14 or more. Some pixels in the filtering area may belong to the P block and the other pixels may belong to the Q block. For example, when the length of the filtering region is 10, 5 pixels may belong to the P block and 5 pixels may belong to the Q block. Alternatively, 3 pixels may belong to the P block and 7 pixels may belong to the Q block. Conversely, 7 pixels may belong to the P block and 3 pixels may belong to the Q block. In other words, the long filter-based deblocking filtering may be performed symmetrically or asymmetrically on the P block and the Q block.

Regardless of the location of the current pixel q, all pixels belonging to the same filtering area may share one and the same first reference value. That is, the same first reference value may be used regardless of whether the currently filtered pixel is located in the P block or the Q block. The same first reference value may be used regardless of the position of the currently filtered pixel in the P block or the Q block.

The second reference value may be derived using at least one of a pixel farthest from the edge (hereinafter, referred to as a first pixel) among pixels of the filtering area belonging to the Q block or neighboring pixels of the filtering area. The neighboring pixel may mean at least one pixel adjacent to the right direction of the filtering area. For example, the second reference value may be derived as an average value between one first pixel and one neighboring pixel. Alternatively, the second reference value may be derived as an average value between two or more first pixels and two or more adjacent pixels adjacent to the right side of the filtering area.

For the weighted average, predetermined weights f1 and f2 may be applied to the first reference value and the second reference value, respectively. Specifically, the encoding/decoding apparatus may define a plurality of weight sets, and may set the weight f1 by selectively using any one of the plurality of weight sets. The selection may be performed in consideration of the length (or number of pixels) of the filtering region belonging to the Q block. For example, the encoding/decoding apparatus may define a weight set as shown in Table 9 below. Each weight set may consist of one or more weights corresponding to each location of the pixel to be filtered. Accordingly, from among a plurality of weights belonging to the selected weight set, a weight corresponding to the position of the current pixel q may be selected and applied to a current pixel q. The number of weights constituting the weight set may be the same as the length of the filtering region belonging to the Q block. A plurality of weights constituting one weight set may be sampled at a predetermined interval within a range of an integer greater than 0 and less than 64. Here, 64 is only an example, and may be larger or smaller than 64. The predetermined interval may be 9, 13, 17, 21, 25 or more. The interval may be variably determined according to the length L of the filtering region included in the Q block. Alternatively, a fixed spacing may be used regardless of L.

TABLE 9

| Length of filtering area belonging to Q block (L) | Weight set |
| --- | --- |
| L > 5 | {59, 50, 41, 32, 23, 14, 5} |
| 5 | {58, 45, 32, 19, 6} |
| L < 5 | {53, 32, 11} |

Referring to Table 9, when the length (L) of the filtering area belonging to the Q block is greater than 5, {59, 50, 41, 32, 23, 14, 5} may be selected among three weight sets, and when L is 5, {58, 45, 32, 19, 6} may be selected, and when L is less than 5, {53, 32, 11} may be selected. However, Table 9 is only an example of a weight set, and the number of weight sets defined in the encoding/decoding apparatus may be 2, 4 or more.

Also, when L is 7 and the current pixel is a first pixel q0 based on the edge, a weight 59 may be applied to the current pixel. When the current pixel is a second pixel q1 based on the edge, a weight 50 may be applied to the current pixel, and when the current pixel is a seventh pixel q6 based on the edge, a weight 5 may be applied to the current pixel.

A weight f2 may be determined based on the pre-determined weight f1. For example, the weight f2 may be determined as a value obtained by subtracting the weight f1 from a pre-defined constant. Here, the pre-defined constant is a fixed value pre-defined in the encoding/decoding apparatus, and may be 64. However, this is only an example, and an integer greater than or less than 64 may be used.

2. In Case of Middle Filter-Based Deblocking Filtering

The filter length of the middle filter may be smaller than the filter length of the long filter. The length (or number of pixels) of the filtering region according to the middle filter may be smaller than the length of the filtering region according to the aforementioned long filter.

For example, the length of the filtering area according to the middle filter may be 6, 8 or more. Here, the length of the filtering region belonging to the P block may be the same as the length of the filtering region belonging to the Q block. However, the present invention is not limited thereto, and the length of the filtering region belonging to the P block may be longer or shorter than the length of the filtering region belonging to the Q block.

Specifically, a filtered pixel fq may be derived using a current pixel q and at least one neighboring pixel adjacent to the current pixel q. Here, the neighboring pixel may include at least one of one or more pixels adjacent to the left of the current pixel q (hereinafter, left peripheral pixels) or one or more pixels adjacent to the right of the current pixel q (hereinafter, right peripheral pixels).

For example, when the current pixel q is q0, two left neighboring pixels p0 and p1 and two right neighboring pixels q1 and q2 may be used. When the current pixel q is q1, two left neighboring pixels p0 and q0 and one right neighboring pixel q2 may be used. When the current pixel q is q2, three left neighboring pixels p0, q0, and q1 and one right neighboring pixel q3 may be used.

3. Short Filter-Based Deblocking Filtering

The filter length of the short filter may be smaller than that of the middle filter. The length (or number of pixels) of the filtering region according to the short filter may be smaller than the length of the filtering region according to the above-described middle filter. For example, the length of the filtering region according to the short filter may be 2, 4 or more.

Specifically, a filtered pixel fq may be derived by adding or subtracting a predetermined first offset (offset1) to a current pixel q. Here, the first offset may be determined based on a difference value between the pixels of the P block and the pixels of the Q block. For example, as shown in Equation 5 below, the first offset may be determined based on a difference value between the pixel p0 and the pixel q0 and a difference value between the pixel p1 and the pixel q1. However, filtering for the current pixel q may be performed only when the first offset is smaller than a predetermined threshold. Here, the threshold is derived based on the above-described quantization parameter (QP) and block boundary strength (BS), and a detailed description thereof will be omitted.

$$\text{offset1}=(9*(q0-p0)-3*(q1-p1)+8)>>4 \quad \text{[Equation 5]}$$

Alternatively, the filtered pixel fq may be derived by adding a predetermined second offset (offset2) to the current pixel q. Here, the second offset may be determined in consideration of at least one of a difference (or change amount) between the current pixel q and the neighboring pixels or the first offset. Here, the neighboring pixels may include at least one of a left pixel or a right pixel of the current pixel q. For example, the second offset may be determined as in Equation 6 below.

$$\text{offset2}=(((q2+q0+1)>>1)-q1-\text{offset1})>>1 \quad \text{[Equation 6]}$$

The above-described filtering method is not limited to being applied only to the deblocking filter, and may be applied similarly or similarly to an adaptive sample offset (SAO), an adaptive loop filter (ALF), etc., which are examples of an in-loop filter.

Exemplary methods of the present disclosure are expressed as a series of operations for clarity of explanation, but this is not intended to limit the order in which steps are performed, and each step may be performed simultaneously or in a different order if necessary. In order to implement the method according to the present disclosure, the exemplary steps may include additional steps, other steps may be included excluding some steps, or may include additional other steps excluding some steps.

Various embodiments of the present disclosure are not intended to list all possible combinations, but to describe representative aspects of the present disclosure, and matters described in the various embodiments may be applied independently or may be applied in combination of two or more.

In addition, various embodiments of the present disclosure may be implemented by hardware, firmware, software, or a combination thereof. For implementation by hardware, one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), general purpose It may be implemented by a processor (general processor), a controller, a microcontroller, a microprocessor, etc.

The scope of the present disclosure includes software or machine-executable instructions (e.g., operating systems, applications, firmware, programs, etc.) that cause an operation according to the method of various embodiments to be executed on a device or computer, and or a non-transitory computer-readable medium (non-transitory computer-readable medium) which stores such software or instructions etc., and is executable on a device or a computer.

The invention claimed is:

1. A method of decoding an image, comprising:
   dividing one picture into a plurality of division units;
   determining whether to perform filtering on a boundary of a current division unit based on a predetermined flag; and
   performing filtering on the boundary of the current division unit in response to the determination,
   wherein the current division unit includes at least one of a sub picture, a slice, or a tile,
   wherein the flag includes at least one of a first flag indicating whether filtering is performed on a boundary of a division unit within the one picture or a second flag indicating whether filtering is performed on the boundary of the current division unit in the one picture,
   wherein whether to perform filtering on the boundary of the current division unit is determined by further considering a third flag indicating whether filtering is performed on a boundary of a neighboring division unit adjacent to the current division unit.

2. The method of claim 1, wherein when the first flag is a first value, it is not restricted so that filtering is not performed on the boundary of the division unit within the one picture, and when the first flag is a second value, the restriction on the boundary of the division unit within the picture is not imposed,
   wherein when the second flag is the first value, it is restricted so that filtering is not performed on the boundary of the current division unit, and when the second flag is the second value, filtering is allowed to be performed on the boundary of the current division unit.

3. The method of claim 2, wherein the second flag is decoded only when it is not restricted so that filtering is not performed on the boundary of the division unit within the one picture according to the first flag.

4. The method of claim 1, wherein a position of the neighboring division unit is determined based on whether the boundary of the current division unit is a vertical boundary or a horizontal boundary.

5. The method of claim 1, wherein performing the filtering comprises:
specifying a block boundary for deblocking filtering;
deriving a decision value for the block boundary;
determining a filter type for the deblocking filtering based on the decision value; and
performing the filtering on the block boundary based on the filter type.

6. A method of encoding an image, comprising:
dividing one picture into a plurality of division units;
determining whether to perform filtering on a boundary of a current division unit; and
performing filtering on the boundary of the current division unit in response to the determination,
wherein the current division unit includes at least one of a sub picture, a slice, or a tile,
wherein determining whether to perform filtering on the boundary of the current division unit comprises,
encoding at least one of a first flag indicating whether filtering is performed on a boundary of a division unit within the one picture or a second flag indicating whether filtering is performed on the boundary of the current division unit in the one picture,
wherein whether to perform filtering on the boundary of the current division unit is determined by further considering a third flag indicating whether filtering is performed on a boundary of a neighboring division unit adjacent to the current division unit.

7. The method of claim 6, wherein when it is determined that filtering is restricted not to be performed on the boundary of the division unit within the one picture, the first flag is encoded as a first value, and when it is determined that the restriction is not imposed on the boundary of the division unit within the picture, the first flag is encoded as a second value,
wherein when it is determined that filtering is restricted not to be performed on the boundary of the current division unit, the second flag is encoded as the first value, and when it is determined that filtering is allowed to be performed on the boundary of the current division unit, the second flag is encoded as the second value.

8. The method of claim 7, wherein the second flag is encoded only when it is not restricted so that filtering is not performed on the boundary of the division unit within the one picture.

9. The method of claim 6, wherein a position of the neighboring division unit is determined based on whether the boundary of the current division unit is a vertical boundary or a horizontal boundary.

10. The method of claim 6, wherein performing the filtering comprises:
specifying a block boundary for deblocking filtering;
deriving a decision value for the block boundary;
determining a filter type for the deblocking filtering based on the decision value; and
performing the filtering on the block boundary based on the filter type.

11. A non-transitory computer-readable storage medium storing instructions that, when executed, cause a processor to:
divide a picture into a plurality of division units;
determine whether to perform filtering on a boundary of a current division unit based on a predetermined flag; and
perform filtering on the boundary of the current division unit in response to the determination,
wherein the current division unit comprises at least one of a sub picture, a slice, or a tile,
wherein the flag comprises at least one of a first flag indicating whether filtering is performed on a boundary of a division unit within the one picture or a second flag indicating whether filtering is performed on the boundary of the current division unit in the one picture,
wherein whether to perform filtering on the boundary of the current division unit is determined by further considering a third flag indicating whether filtering is performed on a boundary of a neighboring division unit adjacent to the current division unit.

\* \* \* \* \*